United States Patent [19]

Shiratori et al.

[11] Patent Number: 4,465,296

[45] Date of Patent: Aug. 14, 1984

[54] UPPER SUPPORT IN VEHICLE SUSPENSION SYSTEMS

[75] Inventors: Harunori Shiratori, Toyota; Yoshikazu Tsukamoto, Inuyama, both of Japan

[73] Assignees: Toyota Jidosha Kogyo Kabushiki Kaisha; Tokai Rubber Industries, Ltd., both of Aichi, Japan

[21] Appl. No.: 359,105

[22] Filed: Mar. 17, 1982

[30] Foreign Application Priority Data

Oct. 31, 1981 [JP] Japan .................................. 56-174838

[51] Int. Cl.$^3$ ............................................. B60G 11/14
[52] U.S. Cl. ................................................. 280/668
[58] Field of Search .................... 280/668, 712, 710; 308/35, 37, 231

[56] References Cited

U.S. PATENT DOCUMENTS 4,042,259  8/1977  Fiedler et al. ........................ 280/668
4,325,566  4/1982  Stephan ................................ 280/668

*Primary Examiner*—Richard A. Bertsch
*Attorney, Agent, or Firm*—Parkhurst & Oliff

[57] ABSTRACT

An upper support for a wheel suspension assembly of a vehicle having a shock absorber. The upper support comprises an inner member connected to a piston rod of the shock absorber, an outer member disposed concentrically with the inner member and fixed to the vehicle body, and a resilient member interposed between the inner and outer members. The outer member consists of two annular halves which are fixed together with their outer peripheral flanges in abutment with each other. Stopper means are provided preferably on the outer member for limiting an axial elastic deformation of the resilient member. One or both axial end portions of the resilient member held in the outer member have an annular groove concentric with the inner member and a plurality of bosses equally spaced along the annular groove. The bosses are axially outwardly projected from an annular abutment portion of the resilient member which is radially inward of the annular groove. The ends of the bosses are in constant abutment on the stopper means and the annular abutment portion comes into contact with the stopper means upon application of high loads to the resilient member. The resilient member preferably has air vents communicating the annular groove with outside atmosphere.

7 Claims, 7 Drawing Figures

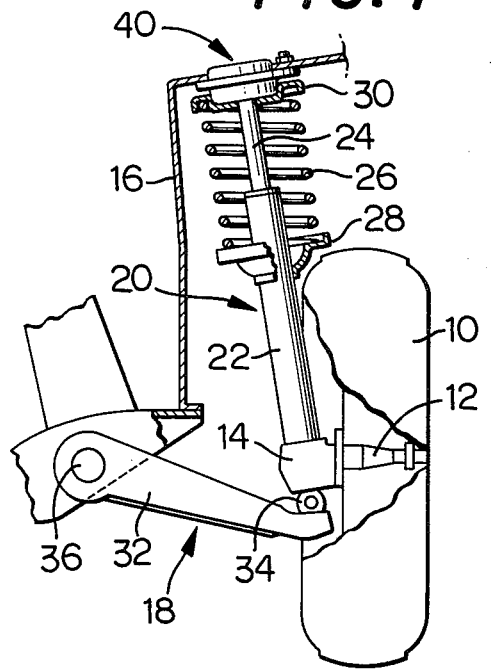
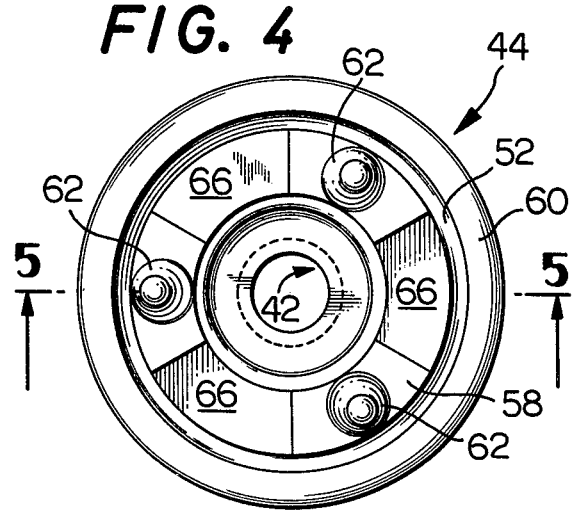
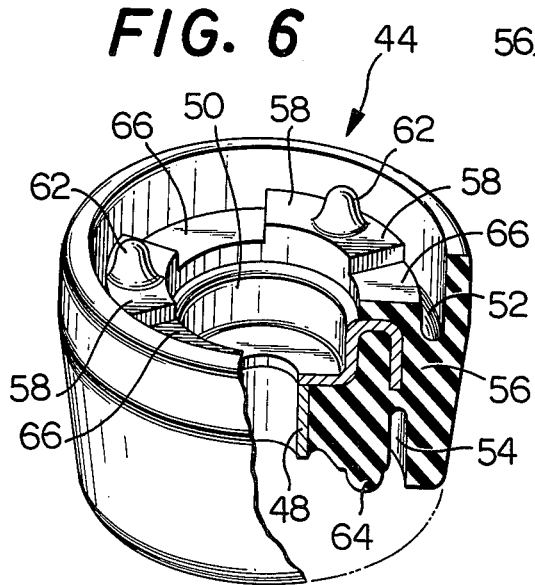
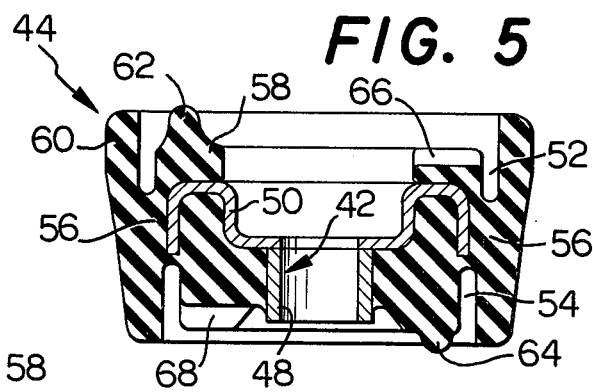
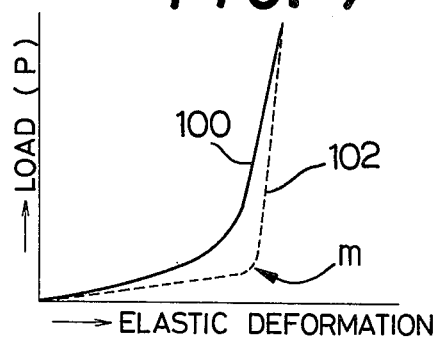

UPPER SUPPORT IN VEHICLE SUSPENSION SYSTEMS

BACKGROUND OF THE INVENTION

This invention relates to an upper support in a vehicle suspension assembly and more particularly, to a damping and mounting device, i.e., an upper support for attaching a piston-cylinder type of shock absorber in a suspension system for motor vehicles, to a part of the vehicle body.

In a conventional motor vehicle wheel suspension assembly known as the Macpherson strut type, there are provided a shock absorber comprising a piston and a cylinder, and a coil spring. The shock absorber is secured, at one end of its piston rod, to a part of the vehicle body via a strut mounting functioning as an upper support while on the other hand, the shock absorber is connected, at its cylinder portion, to a wheel axle via a spindle to rotatably support the wheel. The coil spring is so disposed around the shock absorber as to surround adjacent the periphery of the latter, and generally located between an upper spring seat carried by the strut mounting and a lower spring seat carried by the cylinder. The shock absorber and the coil spring cooperate to cushion the body from an oscillating energy received by the said spindle from the road surface, thereby preventing the oscillatory movements from being transferred to the body.

The strut mounting comprises: a cylindrical inner member to which the piston rod of the shock absorber is connected; a generally cylindrical outer member at which the strut mounting is fixed to the vehicle body; and an annular resilient member (usually made of rubber) disposed between the inner and outer members, and vulcanized thereto or held therein by other means. The resilient member absorbs a residual oscillatory movement of the vehicle wheel which has not been absorbed by the said shock absorber and coil spring, thereby preventing the transfer of such movement to the vehicle body.

While the resilient member is subjected to a shear stress when the oscillatory movements are transferred from the piston rod in the axial direction thereof, it is required, for maintaining a driving comfort of the vehicle under such condition, that the resilient member have non-linear spring characteristics, i.e., it be provided with the structure allowing it to exhibit soft spring characteristics during application of low loads, and at the same time hard spring characteristics which means that the resilient member will not be deformed to a large extent upon application of high loads. To meet the above requirement, it has been proposed to provide an upper support with a suitable stopper means which prevents the resilient member from being deformed beyond a certain limit upon application of a high load thereto. The proposed upper support with such conventional structure, however, has a problem that they are likely to generate unusual sounds or noises due to severe collision of the resilient member with the stopper means upon transfer of a high oscillatory load to the resilient member. Such noises can be readily heard by the vehicle passengers and be a source of discomfort to them, especially where the upper support of that kind is used in a rear wheel suspension which is usually located near a vehicle compartment. The present invention was made in view of the above situation.

SUMMARY OF THE INVENTION

It is accordingly an object of the present invention to provide an improved upper support for a vehicle suspension system having a novel damping and mounting structure.

It is another object of the invention to provide an improved upper support for the same system, which contributes to enhancement of driving comfort of the vehicle.

A further object of the invention is to provide an improved upper support for the same system, which demonstrates spring characteristic defined by a non-linear load-deformation elastic curve.

A still further object of the invention is to provide an improved upper support for the same system, which is free of noises generated due to collision of its resilient member with its stopper member or other reasons.

Other objects and advantages of the invention will be apparent from the following detailed description of a specific embodiment of the invention which is described with reference to the accompanying drawings.

An upper support according to the present invention in a vehicle suspension system comprises: a cylindrical, inner member which is connected to one end of a piston rod of a shock absorber in the suspension system; an outer member which is disposed concentrically with, and radially outwardly of, the inner member with a predetermined distance of radial spacing therebetween, and which is attached to a body of the vehicle; an annular, cylindrical resilient member which is disposed between the inner and outer members; and stopper means which is provided on at least one axial end side of the resilient member to limit an axial deformation thereof. The upper support is characterized in that the said resilient member has, in the axial end portion or portions thereof on the side on which the stopper means is provided, an interruptedly or continuously formed annular groove or grooves of a predetermined depth, and that the resilient member further has, on an annular abutment portion thereof that is located radially inwardly of the annular groove for abutment on the stopper means, a plurality of bosses which are angularly spaced along the annular groove and whose ends are kept in abutment on the stopper means.

In such upper support constructed according to the present invention, the annular groove partially separates the resilient member into an inner annular portion and an outer annular portion which are connected at a narrow bridging portion, whereby the bridging portion acts to establish a soft spring characteristic during application of an initial low load and the stopper means contributes to effective restriction of deformation of the resilient member upon application of a high load. Thus, the upper support may demonstrate the most preferable load-deformation characteristic defined by a non-linear elastic curve. In addition, the plurality of bosses which are projected from a stopper means abutment portion of the resilient member and kept in abutment on the stopper means prevent an otherwise shocking abutment of the stopper means onto the abutment portion and the resultant generation of unusual impact sounds.

While it is recognized that, upon application of a high load, the annular groove or grooves in the resilient member are covered by the stopper means and the communication with the outside atmosphere is blocked whereby there is developed a pressure difference between the air in the groove and the atmosphere due to change in volume of the groove, which causes a rapid air flow in the region of contact between the stopper means and the abutment portion of the resilient member. This air flow tends to generate unusual sounds (air noises). The generation of such unusual sounds, however, may be prevented by providing the stopper means abutment portion of the resilient member with air vent passageways which are not filled in even during high load application, i.e., capable of keeping the annular groove in communication with the outside atmosphere.

A further advantage accruing from the invention resides in that the resilient member accommodated in and held by the outer member fabricated from an annular housing is free from otherwise possible separation from the outer member at the bonded surfaces thereof. Another advantage of the upper support of the invention is that the resilient member may be secured to the outer member without bonding therebetween so that the upper support as a whole may be more easily manufactured and assembled.

BRIEF DESCRIPTION OF THE DRAWINGS

An understanding of the present invention is more readily apparent from the following description of a preferred embodiment of an upper support of the invention and the accompanying drawings in which:

FIG. 1 is a schematic elevation of a vehicle suspension system incorporating a preferred form of a strut mounting serving as an upper support constructed according to the present invention;

FIG. 4 is a plan view of a rubber block which is formed through vulcanization and which serves as a resilient member and an inner member of the upper support;

FIG. 5 is a cross sectional view taken on line 5—5 of FIG. 4;

FIG. 6 is a partially cut-away perspective view of the rubber block of FIG. 4; and FIG. 7 is a graphical representation of load-deformation characteristic of the strut mounting of the present invention in comparison with that of a conventional strut mounting.

DETAILED DESCRIPTION OF THE PREFERRED EMBODIMENT

Figure 2:
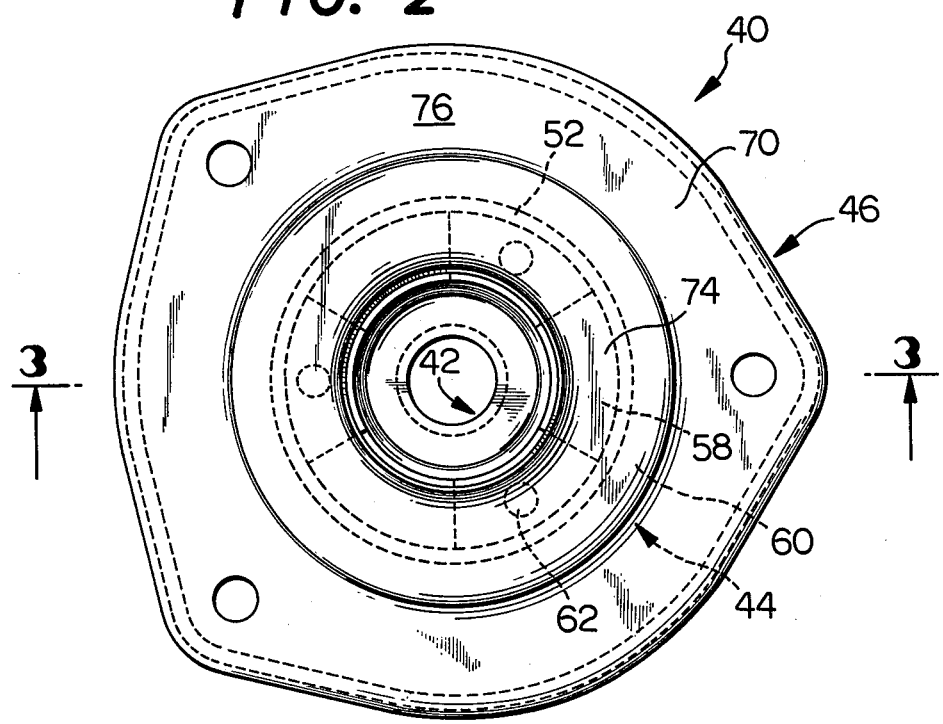
FIG. 2 is a plan view of the strut mounting shown in FIG. 1.

Referring first to FIG. 1, there is illustrated a motor vehicle suspension system in which an axle 12 rotatably supporting a wheel 10 is attached to a spindle 14 which is in turn connected to a part of a vehicle body 16 via a pivotal arm link 18. On the other hand, the spindle 14 is also connected to the body 16 via a shock absorber 20 which comprises a piston cylinder (outer tube) 20 and a piston rod 24, and via a strut mounting 40 serving as an upper support, i.e., the lower end of the cylinder 22 is attached to the spindle 14, and the upper end of the piston rod 24 is attached to the strut mounting 40 which is secured to the body 16. Further, there is disposed, around the outer periphery of the shock absorber 20, a coil spring 26 whose lower and upper ends are respectively seated on, and supported by, a lower spring seat 28 carried by the cylinder 22 and an upper spring seat 30 carried by the strut mounting 40. The pivotal arm link 18 is similar in construction to that used in a conventional Macpherson strut type of suspension system, and the spindle 14 is pivotally connected at a bushing 34 to a lower arm 32 which is in turn pivotably connected at a bushing 36 to the body 16.

The strut mounting 40 according to this invention, as shown in FIGS. 2 through 6, comprises: a cylindrical piston-rod retainer (inner member) 42 made of metal; an annular, cylindrical rubber block (resilient member) 44 vulcanized to the outer periphery of the piston-rod retainer 42 and an annular housing (outer member) 46 made of metal, for accommodating and holding the rubber block 44 therein.

Figure 3:
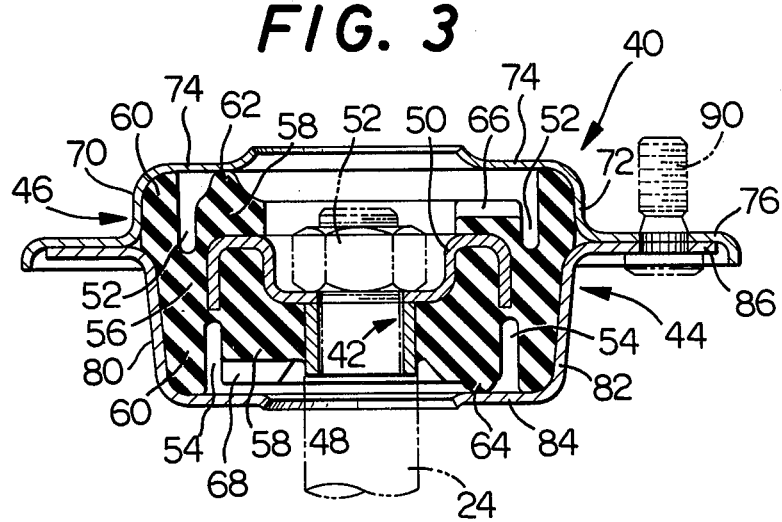
FIG. 3 is a cross sectional view taken on line 3—3 of FIG. 2.

Referring now more particularly to FIG. 3, the retainer 42 is integrally formed of a sleeve portion 48 and a seat portion 50 which is embedded in the rubber block 44. The shock absorber 20 is secured to the strut mounting 40 (more precisely, to the retainer 42) such that the upper end portion of the piston rod 24 is inserted through the sleeve portion 48 and fastened thereto by a nut 51.

The rubber block 44 having a predetermined configuration is bonded to the outer periphery of the retainer 42 through an ordinary vulcanization molding process. As shown in FIGS. 4 through 6, the rubber block 44 has, in its upper and lower end portions (the ends being viewed axially of the piston rod 24), continuously formed annular grooves 52 and 54, respectively, each of which has a predetermined depth. These two annular grooves 52 and 54 cause to create two apparently separated annular portions, i.e., an inner annular portion 58 and an outer annular portion 60 which are in fact connected to each other at a narrow bridging portion 56. The inner annular portion 58 of this rubber block 44 is so formed that its upper and lower end faces (as viewed in FIG. 5) are lower than those of the outer annular portion 60, that is, indented from the corresponding end faces of the annular portion 60 axially inwardly of the rubber block 44, in order that such lower end faces may function as abutment portions for stopper means. On each of the end faces of the inner annular portion 58, there are disposed three small projections or bosses 62, 64 which are equally spaced at an angular interval of 120°, and whose tops are higher than the end faces of the outer annular portion 60, in other words, axially outwardly projected beyond the outer annular portion 60. In addition, in the upper and lower ends of the inner-annular portion 58 and between the said bosses 62, 64, there are provided three air vent passageways 66, 68 of a proper width, which permit the annular grooves 52, 54 to communicate with the outside atmosphere even when the later described stopper means is abutted onto the end faces of the inner annular portion 58. It is noted that the air vent passageways 66, 68 in the inner annular portion 58 are disposed with a 60° angular phase difference from the bosses 62, 64, respectively.

The metallic annular housing 46 which is the outer member of the strut mounting according to the invention, as shown in FIGS. 2-3, is constituted by two hat-shaped members 70 and 80 which are fixed together with their peripheral flanges in abutment on each other. Put in more detail, the hat-shaped members 70, 80, each comprises: a cylindrical portion 72, 82 of circular cross section; an annular interval flange portion 74, 84 which extends radially inwardly from one end of the said cylindrical portion 72, 78 for serving as a means of stopping the rubber block; and an external flange portion 76, 86 which extends radially outwardly from the other end of the cylindrical portion 72, 82 for fixing the housing to the vehicle body. The rubber block 44 (shown in FIGS.

4 through 6) to which the piston-rod retainer 42 is secured is accommodated within the two hat-shaped members 70 and 80 one of which is inverted for abutment on the other at their external flange portions 76 and 86 which are then fixed together as with a spot welding or by other means as required. Thus, the upper support 40 of FIGS. 2 and 3 is obtained. In this connection, the external flange portions 76 and 86 have a proper member of bolts 90 fixed thereto, by which the housing 90 is secured to the body 16.

With the rubber block 44 thus accommodated within the housing 46, the outer annular portion 60 of the rubber block 44 is securely held in and by the housing 46 while the bosses 62 and 64 extending from the upper and lower end faces of the inner annular portion 58 are in abutment on the inner surfaces of the corresponding internal flange portions (stopper means) 74 and 84 of the hat-shaped members 70 and 80 which constitute said housing 46.

In a strut mounting 40 having the afore described structure, an oscillating load (P) to be transferred to the shock absorber 20, more particularly to the piston rod 24, acts on the rubber block 44 of the strut mounting 40 in an axial or vertical direction thereof. The strut mounting 40, however, demonstrates an extremely soft spring characteristic. This desired characteristic of the strut mounting is attributed to its structure wherein the inner annular portion 58 subjected to the load from the piston rod 24, and the outer annular portion 60 are spaced by the annular grooves 52, 54 and connected at the narrow bridging portion 60.

In addition to the above feature, the bosses 62 and 64 provided on the end faces of the inner annular portion 58 are adapted to be constantly in abutment on the corresponding stopper means 74 and 84. These bosses 62 and 64 are gradually deformed or compressed according to the oscillating load (P) acting on the rubber block until the entire end faces of the inner annular portion 58 come into contact with the inner stopping surfaces of the internal flange portions 74 and 84. In other words, the bosses 62, 64 permit the rubber block 44 to relatively smoothly receive the load, thereby enabling the rubber block to exhibit a more preferred spring characteristic defined by a non-linear load-deformation curve without a steep bending, as shown by solid line 100 in FIG. 7. In the absence of such bosses 62, 64, however, a load-deformation curve of the rubber block suddenly rises, as shown by broken line 102 of FIG. 7, as soon as the end faces of the inner annular portion 58 have come into contact with the inner stopping surfaces of the internal flange portions 74 and 84 of the housing 46 whereby the load-deformation elastic curve is bent acutely at point "m" as shown in FIG. 7 at which the rubber block abruptly changes to have a harder spring characteristic.

While it is recognized at such bent point "m" that a rubber block without bosses suffers uncomfortable noises, specifically abutting or bottoming sounds which are generated due to shocking abutment or collision of the end faces of the inner annular portion 58 onto or with the inner stopping surfaces of the internal flange portions 74, 84 of the housing 46, the provision of the bosses 62, 64 of the rubber block 44 according to the present invention eliminates the said bent point "m", thereby effectively preventing the rubber block from generating such uncomfortable noises even when it is subjected to a great amount of oscillating load (P).

In the strut mounting 40 according to the invention, it is also noted that the provision of the air vent passageways 66, 68 in the upper and lower ends of the inner annular portion 58 each having a depth enough to prevent it from being filled in even during application of high loads, allows to keep the annular grooves 52, 54 in communication with the outside atmosphere or prevents air from being entrapped within the annular grooves in the event the entire end faces of the inner annular portion 58 are forced into abutment onto the internal flange portions 74, 84 of the housing 46 due to application of high loads thereto, whereby it is possible to effectively prevent the generation of unusual sounds resulting from a rapid flow of air within the housing. From the standpoint of preventing such noises, it is also possible to replace the air vent passageways 66, 68 with other air vent means such as apertures and slots which are formed in the internal flange portions 74, 84 to communicate the annular grooves 52, 54 with the outside atmosphere. If a stopper means equivalent to the internal flange portions is adapted not to cover the annular grooves and entrap air therein, however, such air vent means are not required at all.

In addition, since the rubber block 44 is accommodated in and held by the annular housing 46 which is constituted by the two hat-shaped members 70 and 80 as in the above embodiment, it is easier to provide or form a stopper means and possible to simplify the structure of the strut mounting. The strut mounting according to the invention is also advantageous in securing safety of operation because of the structure which permits an effective protection of a rubber material against a conventionally encountered separation from an outer member to which the rubber member is bonded, upon application of oscillating loads (P) from the piston rod 24 to the rubber member in the axial direction. Further, there is no need at all to take into consideration such a trouble of separation of the two members at the bonded surfaces, if the rubber block 44 is held by contact with the housing 46, i.e., gripped between the hat-shaped members 70, 80, without bonding between the inner surface of the housing 46 and the outer surface of the outer annular portion 60. This form of a strut mounting wherein the rubber block 44 is accommodated within the housing 46 without bonding therebetween, provides a further benefit of easy manufacture and assembling thereof.

While the above described strut mounting uses, as the most preferred form of outer member, an annular housing which incorporates an integrally formed stoppers means, it is alternatively possible to adopt other known cylindrical members for the same purpose. It will be appreciated to provide a stopper means which is not integral with the outer member. It will also be appreciated that a stopper means may be provided at only one end of the resilient member rather than at both ends thereof, in which case the said annular groove and bosses are provided at that end of the resilient member which faces the stopper means.

It is noted that the annular groove 52, 54 provided in at least one end portion of the rubber block 44 is disposed so as to define the radially spaced, inner and outer annular portions 58, 60, and that its width and depth are determined as desired to establish a soft spring characteristics required of the bridging portion 56.

It is also noted that the size, number and arrangement of the projecting bosses 62, 64, and air vent passageways 66, 68 provided on and in the end portions of the inner annular portion 58 are determined as needed according to their function and performance required.

Further, an upper support in accordance with the present invention may be advantageously employed in either front or rear suspension systems of a motor vehicle. The application of the upper support of the invention is not limited to the Macpherson strut type of suspension systems, that is, the upper support may be used in any suspension system of the type wherein a shock absorber is used and the piston rod is fixed to a part of the vehicle body.

It is further understood by those skilled in the art that other changes and modifications may be made in the invention without departing from the spirit and scope thereof.

What is claimed is:

1. An upper support for use in a wheel suspension system of a vehicle having a shock absorber which includes a piston rod, said upper support comprising:
   a cylindrical inner member connected to one end of the piston rod of the shock absorber;
   an outer member disposed concentrically with, and radially outwardly of, said inner member with a predetermined distance of radial spacing therebetween, said outer member being fixed to the vehicle body;
   an annular, cylindrical resilient member interposed between said inner and outer members; and
   stopper means, provided on at least one axial end side of the resilient member, for limiting an axial deformation of said resilient member, said resilient member having, in an axial end portion thereof on said at least one axial end side, an annular groove formed substantially continuously and concentrically with said inner member and having a predetermined depth, said resilient member further having a plurality of bosses which are angularly spaced along said annular groove and which are axially projected from an annular abutment portion of the resilient member located radially inwardly of said annular groove for abutment on said stopper means, projected ends of said plurality of bosses being kept in abutment on said stopper means.

2. An upper support as recited in claim 1, wherein said annular abutment portion of said resilient member has air vent passageways which keep said annular groove in communication with outside atmosphere.

3. An upper support as recited in claim 2, wherein said plurality of bosses are equally spaced along said annular groove at a predetermined angular interval, and each of said air vent passageways is disposed between said plurality of bosses.

4. An upper support as recited in claim 2, wherein said stopper means is an integral part of said outer member which radially extends therefrom in confrontation with the axial end surface of said resilient member with a predetermined distance of axial spacing therebetween.

5. An upper support as recited in claim 4, wherein said annular abutment portion of said resilient member located radially inwardly of said annular groove is axially inwardly indented from a portion of the same which is located radially outwardly of said annular groove and fixed to said outer member.

6. An upper support as recited in claim 4, wherein:
   said resilient member has said annular groove, said plurality of bosses and said air vent passageways in axially opposite end portions thereof;
   said outer member consists of an annular housing which are constituted by two hat-shaped members each comprising: a cylindrical portion; an annular internal flange portion radially inwardly extending from one end of said cylindrical portion to serve as said stopper means; and an external flange portion extending radially outwardly from the other end of said cylindrical portion for securing said housing to the vehicle body; and
   said two hat-shaped members are disposed with one member inverted with said external flange portion thereof in abutment on said external flange portion of the other member to form said annular housing within which are accommodated said resilient member and said inner member secured thereto.

7. An upper support as recited in claim 6, wherein said resilient member to which said inner member is secured is accommodated in, and held by, said annular housing without bonding therebetween.

* * * * *